United States Patent [19]
Chan

[11] Patent Number: 5,899,956
[45] Date of Patent: May 4, 1999

[54] VEHICLE MOUNTED NAVIGATION DEVICE

[75] Inventor: Chuk David Chan, Lawrenceville, Ga.

[73] Assignee: Advanced Future Technologies, Inc.

[21] Appl. No.: 09/052,188

[22] Filed: Mar. 31, 1998

[51] Int. Cl.[6] .......................... G01C 21/00; G06F 165/00; G06G 7/78
[52] U.S. Cl. ............................ 701/213; 340/988
[58] Field of Search .................... 701/211, 123, 701/201, 204, 213, 49, 216, 206, 207, 208, 209; 340/991, 994, 995, 990, 998; 354/266, 550

[56] References Cited

U.S. PATENT DOCUMENTS

| | | | |
|---|---|---|---|
| 4,625,210 | 11/1986 | Sagl | 342/20 |
| 4,896,855 | 1/1990 | Furnish | 248/206.3 |
| 5,262,813 | 11/1993 | Scharton | 354/266 |
| 5,504,482 | 4/1996 | Schreder | 340/995 |
| 5,544,060 | 8/1996 | Fujii et al. | 364/444 |
| 5,552,990 | 9/1996 | Ihara et al. | 364/444 |
| 5,568,211 | 10/1996 | Bamford | 396/429 |
| 5,596,382 | 1/1997 | Bamford | 396/429 |
| 5,631,638 | 5/1997 | Kaspar | 340/902 |
| 5,642,106 | 6/1997 | Hancock et al. | 340/988 |
| 5,646,856 | 7/1997 | Kaesser | 364/449.4 |
| 5,652,706 | 7/1997 | Morimoto et al. | 364/449.4 |
| 5,654,892 | 8/1997 | Fujii et al. | 364/449.5 |
| 5,667,176 | 9/1997 | Zamaruipa et al. | 248/231.5 |
| 5,790,403 | 8/1998 | Nakayama | 364/424.033 |
| 5,790,973 | 8/1998 | Blaker et al. | 701/123 |
| 5,802,727 | 9/1998 | Blank et al. | 33/361 |

FOREIGN PATENT DOCUMENTS

WO 83/02590  4/1993  WIPO .

*Primary Examiner*—William A. Cuchlinski, Jr.
*Assistant Examiner*—Tim Wyckoff
*Attorney, Agent, or Firm*—Larry J. Guffey

[57] ABSTRACT

A vehicle mounted, navigation device is disclosed. This invention combines a global position system (GPS) with an image capturing system into a portable device that can be optimally mounted within a vehicle. The image capturing system detects and interprets visual information in the vicinity of the vehicle to provide the vehicle operator with appropriate navigational guidance assistance and to compensate for the positioning errors embedded in commercial GPS signals. Additionally, the device has the capability to store consecutive frames of detected, visual information so as to enable the device to be used for accident aftermath analysis and the documentation of an event or scene that occurs within the vicinity of the vehicle. The device includes a mounting assembly which enables the device to be used in most automotive vehicles, with the device usually being mounted behind the vehicle's rearview mirror such that a set of directional turning indicators naturally fall within the vehicle operator's field of view.

20 Claims, 12 Drawing Sheets

VEHICLE MOUNTED NAVIGATION DEVICE

CROSS-REFERENCE TO RELATED APPLICATION

This application is related to a co-pending application by the same inventor entitled "PROACTIVE GUIDANCE SYSTEM UTILIZING VISUAL DETECTION MEANS," filed on Nov. 7, 1997, Ser. No. 08/966,497. The teachings of of this co-pending application are incorporated herein by reference to the extent that they do not conflict with the teachings herein.

BACKGROUND OF THE INVENTION

1. Field of the Invention

This invention generally relates to vehicle-mounted, navigational guidance and image capturing systems, and the means for improving their portability and usability. More particularly, this invention relates to devices capable of detecting and interpreting visual information in the vicinity of a vehicle.

2. Description of the Related Art

There exist many types of vehicular navigational systems. The most sophisticated of these utilize local-area, digitized-road-map systems with video monitors which display a map portion of interest and a cursor that indicates the position of the driver's vehicle within the map portion of interest. The position of the vehicle is typically determined by using either a combination of a wheel-sensor odometer and a compass or the reception of electric signals from global positioning system (GPS) satellites. Using such a digitized map, the driver can locate departure and destination points on the map, and then visually follow the displayed map as the driver travels towards the desired destination point. During this travel, the portion of the map that is displayed is periodically adjusted to keep the cursor representing the driver's current position within the displayed map portion.

Several recent U.S. patents have been directed towards inventions to provide such navigation aids or to improve upon the various components of existing systems. For example, U.S. Pat. No. 5,552,990 discloses an improved vehicle position detecting apparatus that utilizes tire rotation and bearing sensors, along with techniques for compensating for road map errors, to compute the current position of the vehicle.

U.S. Pat. No. 5,652,706 discloses a vehicle navigation system that utilizes global positioning system (GPS) data along with sensors for monitoring tire rotation to determine the current position of the vehicle. This system includes a computer with an arithmetic section that, in the event the driver deviates from an initially identified optimum route, researches from stored, local area map data the shortest distance route back to the optimum route, with preference being given to those routes which avoid the driver having to make a U-turn. This system also includes an optional vocal control section that can provide voice guidance for the driver.

U.S. Pat. No. 5,642,106 discloses a visual incremental turn detector. This patent suggests that such a camera might be combined with an odometer and a CD-ROM device, for storing digitized video information obtained by driving an associated vehicle over a known course, in order to allow the subsequent determination of the present position of an automobile traveling along this same course. These elements are then described as being combinable with a computer and a video monitor or audio speaker to communicate navigation instructions to the driver.

U.S. Pat. No. 5,544,060 discloses a vehicle navigation system that sequentially outputs updated path information, based on a calculated optimal path, in accordance with the determined present position of the vehicle. This determination is described as being made by utilizing an axle sensor and a geomagnetic (or bearing) sensor. The path information is given by a microprocessor-generated videographical directional indicator that displays turn icons, along with pertinent road names and indications of the distance to be traveled before making the next scheduled turn. Similarly, U.S. Pat. No. 5,654,892 describes the improvement that consists of allowing for the display of more complex icons that indicate various road anomalies along with turn directions.

U.S. Pat. No. 5,646,856 describes a vehicle navigation system including means for storing data representing a route to be followed; means for detecting an actual position of and the actual path traveled by the vehicle; comparison means for comparing the actual position of the vehicle to the route to be followed; and means responsive to said comparison means for giving direction commands to the vehicle operator; and particularly manually operable means for inputting data representing a desired route. The means disclosed for detecting an actual position of the vehicle consists of "angle sensors and sensors on the vehicle wheels." By obeying the direction commands, the operator is able to steer the vehicle along the selected route. The advantage cited for this system is that it does not require a route search algorithm or an extended database and is therefore less complex and less expensive to produce than previously known systems.

U.S. Pat. No. 5,504,482 discloses an optional electro-optical obstacle detection system which is part of a larger automobile navigation guidance, control and safety system.

In terms of the mounting of a device so that it is visible to a vehicle operator but does not interfere with the operator's field of view, U.S. Pat. Nos. 5,667,176, 5,631,638, 4,625,210 and 4,896,855 disclose various mounting arrangements.

None of these vehicle navigation systems are proactive. Most of them require a driver to repetitively study a displayed map, thereby diverting attention away from the road and the safe operation of the automobile.

In general, these prior art systems can be classified into three major types. The first type consists of built-in systems in which the systems are designed into a new vehicle at the factory. The second type consists of after-market adds-on devices in which the devices are securely added to the vehicles after the vehicles are on the ground. The third type consists of those that run on portable computers with a GPS devices attached to the such computers. Even though there are advantages in all these systems, there are significant disadvantages in all them.

The main problem with the built-in systems are their high cost-to-usage ratio. Because they are hardwired into the vehicle and thus cannot be moved from one vehicle to the next, such systems often sit idle most of the time. Furthermore, they are usually dedicated to the single purpose of providing navigational assistance, a need that most people experience only occasionally. And, they are usually only available on the more expensive vehicles.

The main problem with most of the adds-on type navigational systems is that they tend to alter the inside look of the vehicles and also require installations that are often destructive to the vehicles, such as drilling a number of holes on the floor pan of the vehicles in order to allow the system's equipment be held securely while the vehicle is in motion.

Once installed, the equipment takes up valuable space and often gets in the way of operator when the system is not in use.

The main problem with the navigation systems utilizing GPS devices with portable computers that the use of such systems can often create a hazardous situation for their users. Such situations arise because it is often difficult to find an easily observable place in the vehicle where portable computer can be securely fastened. So, unless there is a companion traveling with the vehicle operator who can hold and operate the portable computer, the use of such navigation systems may be ill-advised, possibly even an irresponsible act once the vehicle is in motion.

The common problem found in existing navigation systems is that they require the vehicle operator to look at a map, or other means that contains directional information, on some sort of display that is outside the vehicle operator's normal field of view when the vehicle is in motion. In most cases, operators have to turn their heads to look sideways or downward to see the displays. This can make driving with such navigation system a challenging and hazardous task.

Some navigation systems have attempted to overcome this problem by providing synthesized speech feedback to the vehicle operator. However, such solutions are not always viable. For example, in the case of convertible vehicles or when the vehicle's windows are down with loud noises in the vicinity, any voice feedback is often inaudible. In other cases, such as during casual trips, vehicle operators may find such communications to be interruptive of their preferred silence, conduct of a conversation with a passenger, or listening to a radio or stereo.

Despite this prior art, the need exists for an improved vehicle navigation device with more precise position determining means and a proactive, driver-friendly interface that reduces diversions away from the driver's safe, attentive operation of the vehicle.

SUMMARY OF THE INVENTION

The present invention is generally directed to satisfying the needs set forth above and the problems identified in the prior arts. The problem of high cost-to-usage ratio is solved by making the device portable so that it can be moved from one car to another, thereby making it possible to increase the percentage of time that the device is in use. Additionally, the present invention is designed so as to be capable of performing more than just navigational assistance tasks, thereby further increasing its probable percentage of time in use.

Installation problems with prior navigational systems are overcome by providing the present invention with unique mounting capabilities. Similarly, problems associated with the inadequacy of the communication capabilities of prior systems are overcome by the use of a set of directional indicators which are located underneath the vehicle's rearview mirror so that the indicators lie within the vehicle operator's normal field of view.

More particularly, the present invention is directed to an improved, proactive vehicle guidance device that is capable of detecting and interpreting visual information in the vicinity of a vehicle in order to provide the vehicle operator with appropriate navigational guidance assistance and to compensate for the positioning errors embedded in commercial GPS signals. The invention further relates to the integration and improvement of various technologies and methods to provide a practical vehicular navigation system that is both safe and accurate to use.

In accordance with one preferred embodiment of the present invention, the foregoing need can be satisfied by providing a vehicle-mounted, navigation device, comprising:

a computational unit having: (A1) a computational microprocessor, and (A2) a computational memory and storage device coupled to the computational microprocessor for providing both temporary and persistent storage capabilities, a communications unit having: (B1) a data input and output port connected to the computational unit that receives data from and communicates data to an external computer, (B2) a global position system (GPS) antenna and receiver that are connected to said computational unit for receiving signals from GPS satellites, wherein said computational unit further comprises the means for processing said GPS signals to determine the current position of said vehicle, and (B3) means for providing communications from said computational unit to the vehicle operator, said means connected to said computational unit and chosen from the group consisting of: (B3i) a directional indicator screen that displays icons which provide navigational information in a visual form, and (B3ii) a voice input-output system having an audio receiver, which is connected to said computational unit so that the vehicle operator may speak into the receiver and have said spoken message converted into digital information for input into said computational unit, and a sound generating device that uses portions of the computational unit's digital output to provide the vehicle operator with navigational information in an audible form, a vision unit having: (C1) an image capturing device for detecting visual information that comes within the vicinity of the vehicle, this visual information including road and traffic signs nearby the traveled roadway, markings on the traveled roadway and the general scenery adjacent to the traveled roadway, (C2) a vision microprocessor coupled to the image capturing device and running image enhancement and pattern recognition software for converting the detected visual information into digital information, (C3) a vision memory device coupled to the vision microprocessor, (C4) a persistent memory device coupled to the vision microprocessor, (C5) means connected to the vision microprocessor for automatically storing on a periodic basis in the persistent memory device a plurality of consecutive frames of detected visual information that comes within the vicinity of the vehicle, and (C6) means connected to the vision microprocessor for manually triggering the storage in the persistent memory device of consecutive frames of detected visual information that comes within the vicinity of the vehicle, wherein the stored frames can be used for various purposes, including accident aftermath analysis and documentation of the visual aspects of an event or scene that occurs within the vicinity of the vehicle, and a mounting assembly for mounting these units so as to allow the units to be securely and steadily positioned, while at the same time causing minimum interference with the vehicle operator's field of view, this assembly providing for a mounting arrangement chosen from the group consisting of mounting the units behind the vehicle's rearview mirror, mounting the units as an integral part of the vehicle's rearview mirror and mounting the units so that they attach to the vehicle's front windshield.

In a preferred embodiment, for a vehicle having a rearview mirror with a mirror attached to the front surface of a frame and from the rear side of the frame extends a mounting arm that holds the frame in a desired position and connects the frame to an interior surface of the vehicle, the mounting assembly for mounting these units behind the vehicle's rearview mirror comprises: (a) a case having a box-shape with inner and outer surfaces, including outer front and top surfaces, the units being operationally connected to the inner surfaces so that the case forms a protective enclosure for the units, the case so configured and of a size so that, when the front surface of the case is in close proximity to the rear surface of the rearview mirror frame, the vehicle operator's field of view is not obstructed, and the outer top surface of this case having a recessed portion that accommodates the rearview mirror frame's mounting arm while allowing the front outer surface of the case to be placed in close proximity to the rear surface of the rearview mirror frame, (b) a ball joint attached to the case's outer top surface, (c) an extendible pole having a top end and a bottom end, said bottom end being attached to the ball joint, said pole having a plurality of tubular members that are retractably emeshed with each other, (d) a clamp having a clamp base, a pair of clamping jaws attached to the clamp base, and means coupled to the clamping jaws for biasing the clamping jaws towards one another so that they releasably affix said clamp to said rearview mirror frame mounting arm, and (d) a hinge that couples the clamp base with the top end of the extendible pole.

In a second preferred embodiment, for mounting these units so that they attach to the vehicle's front windshield, the mounting assembly comprises: (a) a case having a boxshape with inner and outer surfaces, including outer front and top surfaces, the units being operationally connected to the inner surfaces so that the case forms a protective enclosure for the units, the case so configured and of a size so that the case provides minimum obstruction to the vehicle operator's field of view, (b) a ball joint attached to the case's outer top surface, (c) an extendible pole having a top end and a bottom end, the bottom end being attached to the ball joint, the pole having a plurality of tubular members that are retractably emeshed with each other, (d) a mounting platform having a base, a mounting arm extending from the base, and a plurality of adhesive pads cups attached to the base that releasably affix the platform to the front windshield of the vehicle, (e) a clamp having a clamp base, a pair of clamping jaws attached to the clamp base, and means coupled to the clamping jaws for biasing the clamping jaws towards one another so that they releasably affix the clamp to the mounting arm of the mounting platform, and (f) a hinge that couples the clamp base with the top end of the extendible pole.

In a third preferred embodiment, for mounting the units as an integral part of the vehicle's rearview mirror, the mounting assembly comprises: a case having a box-shape with inner and outer surfaces, including outer front, back and side surfaces, the units being operationally connected to the inner surfaces so that the case forms a protective enclosure for the units, wherein the vehicle has a rearview mirror assembly that is especially configured to mesh with the case, the rearview mirror assembly comprising a frame having a pair of leg portions horizontally spaced apart from one another and connected by a middle portion, which has a front, rear and top surface, the middle portion extending between and connected to the leg portions so as to define a slot in the frame for receiving and supporting the sides of the case therein between the leg portions and the rear surface of the middle portion, wherein the rearview mirror assembly further comprising a mirror attached to the front surface of the middle portion of the frame, a mounting arm having a top and bottom end, the bottom end being attached to the top surface of the middle portion, the arm holding the frame in a desired position with top end of the arm connected to an interior surface of the vehicle.

This new and improved, vehicle mounted, navigation device is seen to achieve its object of enhancing a vehicle operator's ability to comprehend and quickly react to all the information that comes within the field of view of the vehicle, thereby enhancing the operator's navigational capabilities.

Other objects and advantages of this invention will become readily apparent as the invention is better understood by reference to the accompanying drawings and the detailed description that follows.

DESCRIPTION OF THE PREFERRED EMBODIMENT

Figure 1:
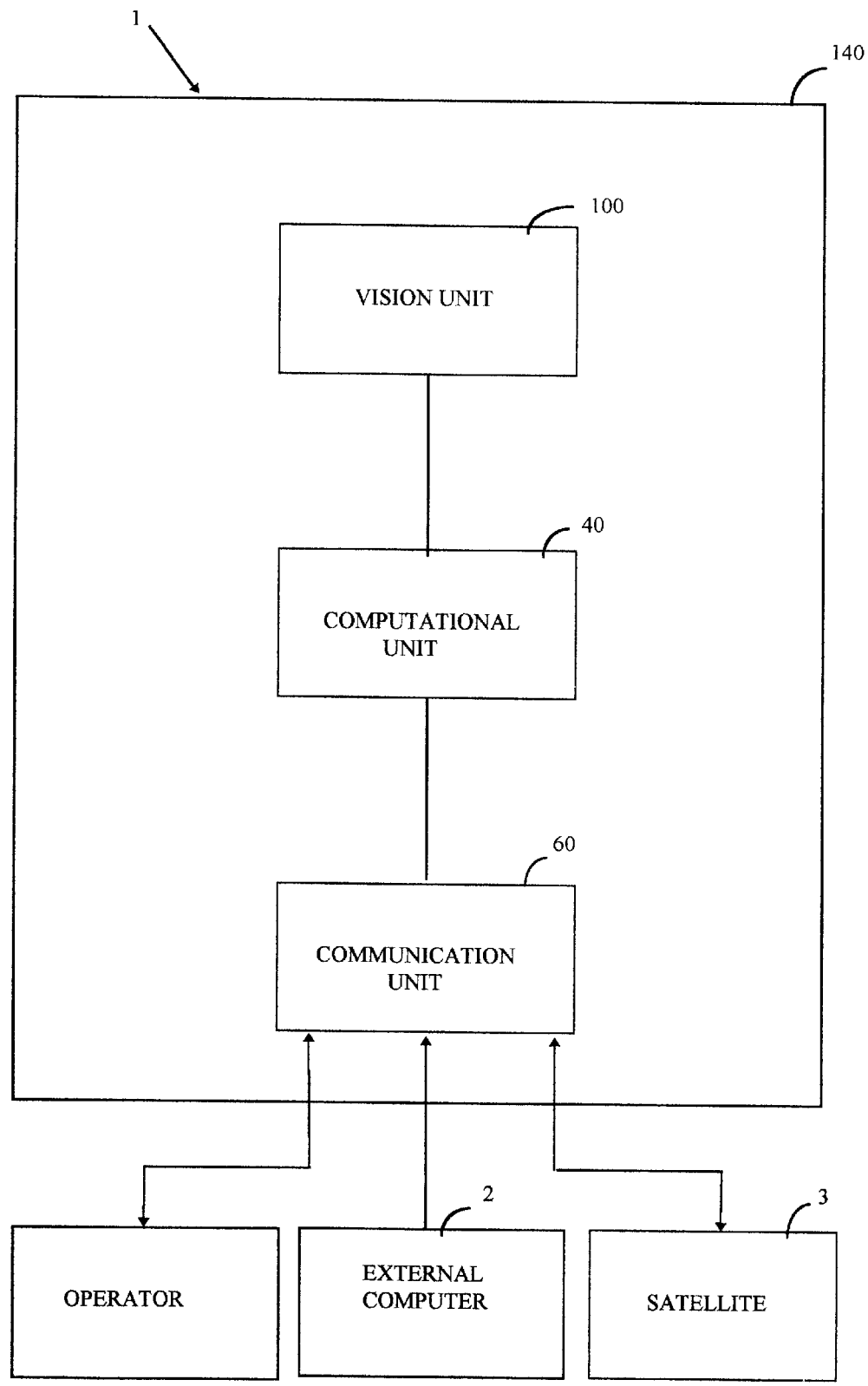
FIG. 1 is a schematic block diagram showing the essential components of one embodiment of the present invention.

Referring now to the drawings wherein are shown preferred embodiments and wherein like reference numerals designate like elements throughout, there is shown in FIG. 1 a schematic block diagram showing the essential components of one embodiment in accordance with the present invention.

As shown in FIG. 1, the vehicle mounted, navigation device, 1, comprises: a computational unit, 40, a communications unit, 60, a vision unit, 100 and a mounting assembly, 140, for mounting the units so as to allow them to be securely and steadily positioned, while at the same time causing minimum interference with the vehicle operator's field of view.

The device's mounting assembly, 140, is designed to enable the device, 1, to be fitted into almost any vehicles and, for the most part, hidden behind the vehicle's existing rearview mirror so as to avoid blocking driver's field of view and also to minimize altering the look and feel of the original interior of the vehicle.

Figure 2:
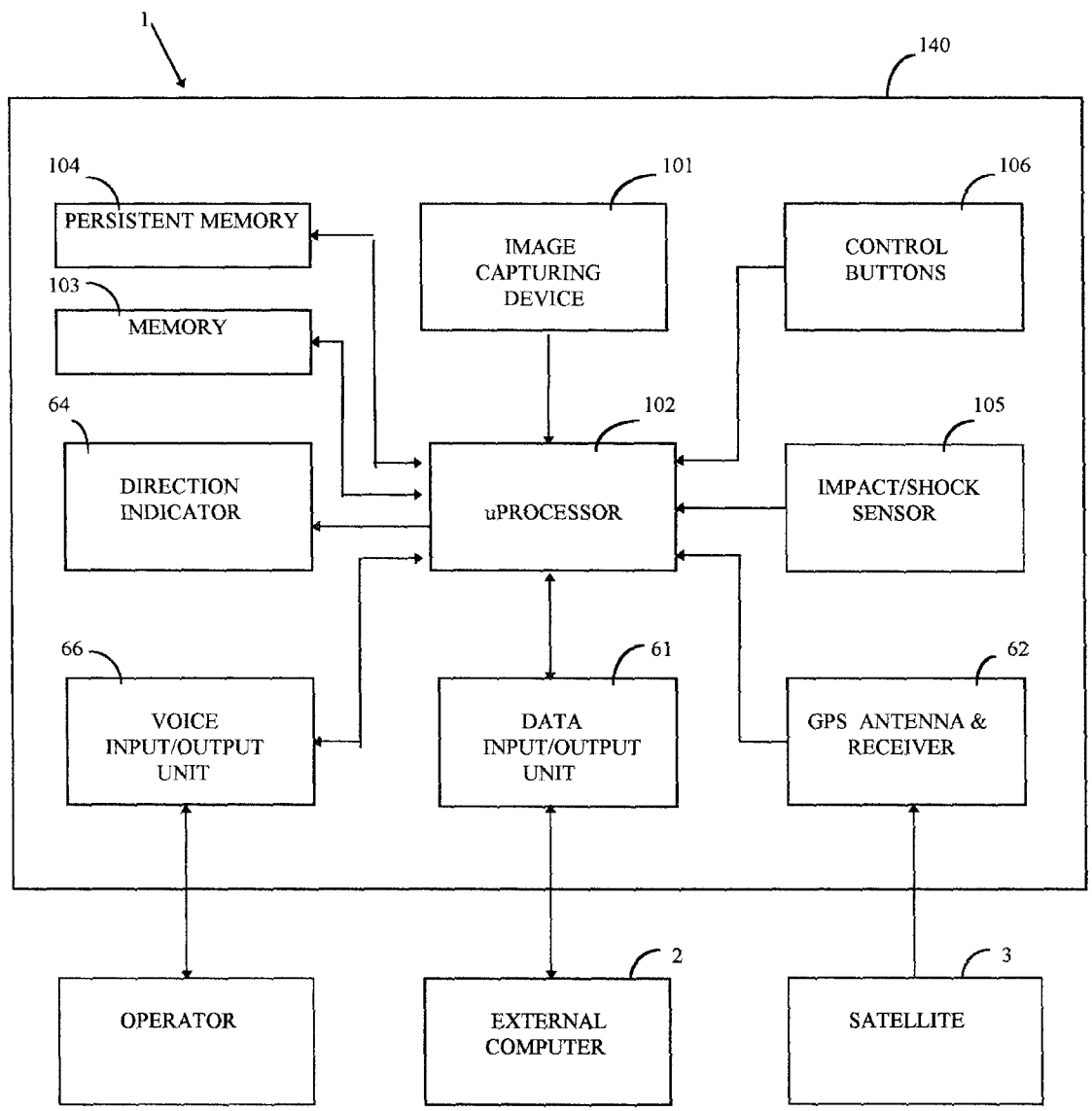
FIG. 2 is a schematic block diagram showing in more detail the essential components of one embodiment of the present invention.

FIG. 2 is a schematic block diagram showing in more detail the essential components of one embodiment of the present invention. It is seen to comprise: an image capturing device, 101, for detecting visual information that comes within the vicinity of the vehicle, the visual information including road and traffic signs nearby the traveled roadway, markings on the traveled roadway and the general scenery adjacent to the traveled roadway, a microprocessor, 102, coupled to the image capturing device, 101, and running image enhancement and pattern recognition software for converting the detected visual information into digital information, a memory device, 103, coupled to the microprocessor, 102, a persistent memory device, 104, means, 105, such as a impact/shock sensor, connected to the vision microprocessor, 102, for triggering the automatic storage in the persistent memory device, 104, of a plurality of consecutive frames of detected visual information that comes within the vicinity of the vehicle, and means, 106, such as a control button, connected to the vision microprocessor, 102, for manually triggering the storage in the persistent memory device, 104, of consecutive frames of detected visual information that comes within the vicinity of the vehicle, wherein the stored frames can be used for various purposes, including accident aftermath analysis and documentation of the visual aspects of an event or scene that occurs within the vicinity of the vehicle.

Additional elements shown in FIG. 2 include: a data input and output port, 61, connected to the microprocessor, 102, that receives data from and communicates data to an external computer, 2, a global position system (GPS) antenna and receiver, 62, that are connected to the microprocessor, 102, for receiving signals from a GPS satellite, 3, wherein the microprocessor, 102, further comprises the means for processing said GPS signals to help determine the current position of said vehicle, and the means, 63, for providing communications from the microprocessor, 102, to the vehicle operator, this means, 63, being connected to the microprocessor, 102, and chosen from the group consisting of a directional indicator screen, 64, that displays icons, 65, which provide navigational information in a visal form, and a voice input-output system, 66, having an audio receiver which is connected to the microprocessor, 102, so that the vehicle operator may speak into the receiver and have this spoken message converted into digital information for input into the microprocessor, 102, and a sound generating device that uses portions of the computational unit's digital output to provide the vehicle operator with navigational information in an audible form.

Figure 3:
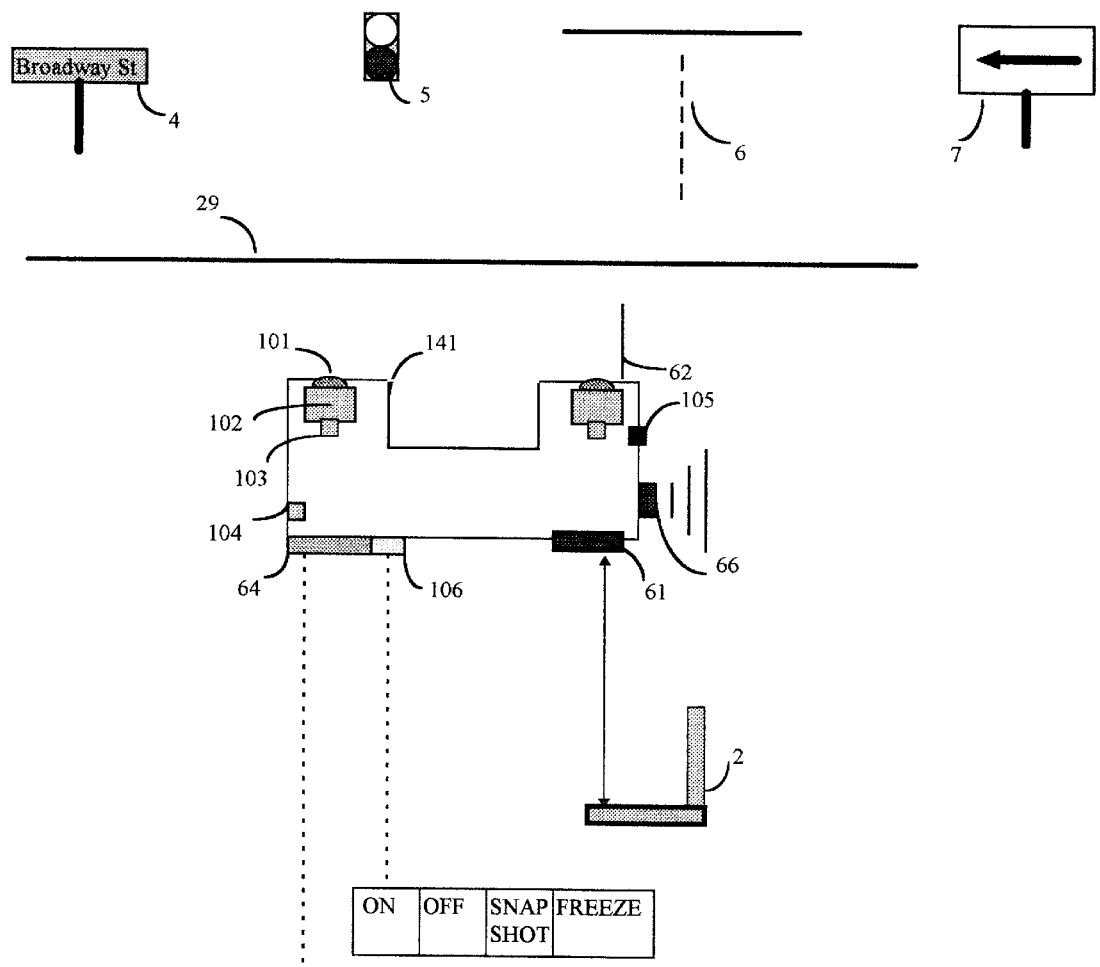
FIG. 3 is a top view of a preferred embodiment of the vehicle mounted, navigation device.
Figure 3:
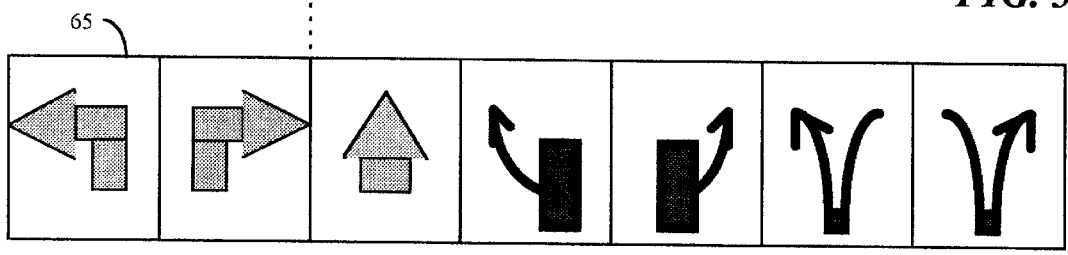

FIG. 3 is a top view of a preferred embodiment ofthe present invention. Shown are: an image capturing device, 101, for detecting visual information that comes within the vicinity of the vehicle, the visual information including road, 4, and traffic, 5, signs nearby the traveled roadway, markings, 6, on the traveled roadway and the general scenery, 7, adjacent to the traveled roadway. Coupled to the image capturing device, 101, are a microprocessor, 102, , a memory device, 103, a persistent memory device, 104, means, 105, such as a impact/shock sensor, for triggering the automatic storage in the memory device, 104, of a plurality of consecutive frames of detected visual information that comes within the vicinity of the vehicle, and means, 106, such as a control button, for manually triggering the storage in the persistent memory device, 104, of consecutive frames of detected visual information that comes within the vicinity of the vehicle, a data input and output port, 61, that receives data from and communicates data to an external computer, 2, a global position system (GPS) antenna and receiver, 62, a directional indicator screen, 64, that displays icons, 65, which provide navigational information in a visual form, and a voice input-output system, 66.

For navigational purposes, the external computer, 2, is used by the vehicle operator to help determine the desired travel route. This is accomplished by having the external computer, 2, run map software that is capable of displaying a map representing the roadways in the desired area of travel. The vehicle operator inputs the vehicle's desired destination. The device, 1, interacts with the computer, 2, to guide the operator to travel on selected roadways and allows the operator to see the current vehicle position along its travel path on the computer's display screen. Alternatively, the travel route data can be downloaded from the external computer, 2, via the input and output port, 61, and stored in the device's memory, 103; thereby, allowing the external computer, 2, to be put away during the trip for driving safety reason. And in the case when a computer, 2, is not available, the operator can specify a traveling route as a sequence of street names, traffic lights and turns information via a voice input-output system, 66. In this situation, the device, 1, will use its imaging capability alone to provide direction guidance so as to relieve the driver of having to memorize the travel instructions or constantly look up written directions.

To notify the vehicle operator of when to make turns, in addition to an audio prompt, the device, 1, provides a directional indicator screen, 64, that is located at the bottom of the mounting assembly's case, 141. This screen may be pulled down via a lever, thereby allowing the screen to hang right underneath and behind the vehicle's rearview mirror, 10, and thus within the vehicle operator's field of view. This directional indicator screen, 64, may be illuminated by light emitting diodes (LEDs) controlled by the microprocessor.

The device's ability to capture and store consecutive frames of visual information that comes within the vicinity of the vehicle means that the device, 1, can be used for purposes other than strictly navigation. For example, an image capturing device may be triggered to essentially taking snapshots of road scene while the vehicle is in motion and keep the last few seconds of such images in the device's persistent memory, 104. In case of a car crash, these stored image can be retrieved for aftermath analysis. the device, 1, is also equipped with a manual trigger to allow the vehicle's operator to take snapshots of road scene deemed to be worth capturing and saving.

Figure 4:
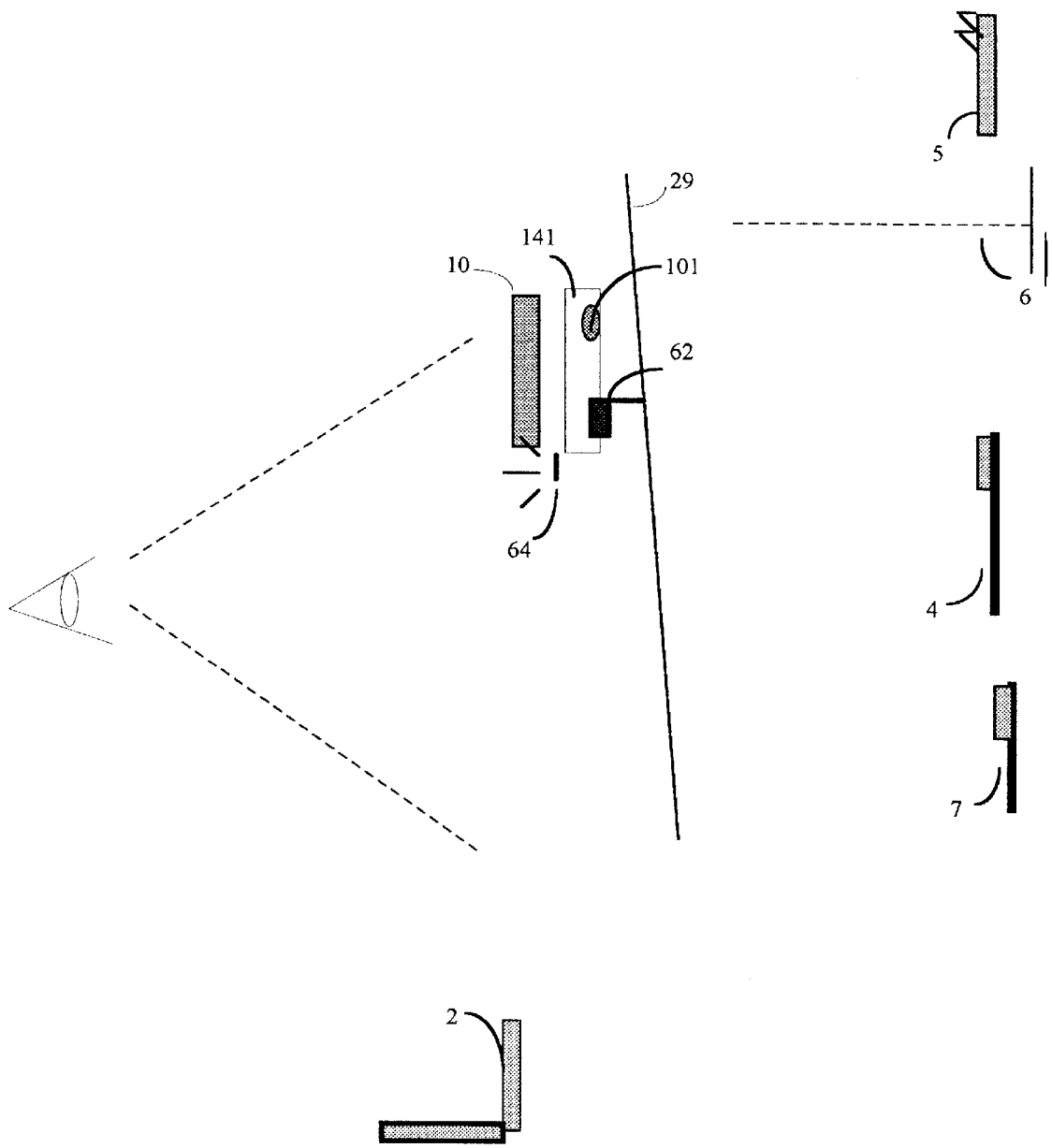
FIG. 4 is a side view of a preferred embodiment of the vehicle mounted, navigation device.

FIG. 4 is a side view of a preferred embodiment of the present invention. It shows the approximate spatial relationship between an image capturing device, 101, of the present invention and the visual information that comes within the vicinity of the vehicle. This visual information including road, 4, and traffic, 5, signs nearby the traveled roadway, markings, 6, on the traveled roadway and the general scenery, 7, adjacent to the traveled roadway. In this embodiment the invention's mounting assembly, 140, includes a case, 141, that is mounted behind the vehicle's rearview mirror. It can be noted that the mounting of the device, 1, do not interfere with the operator's field of view.

Figure 5:
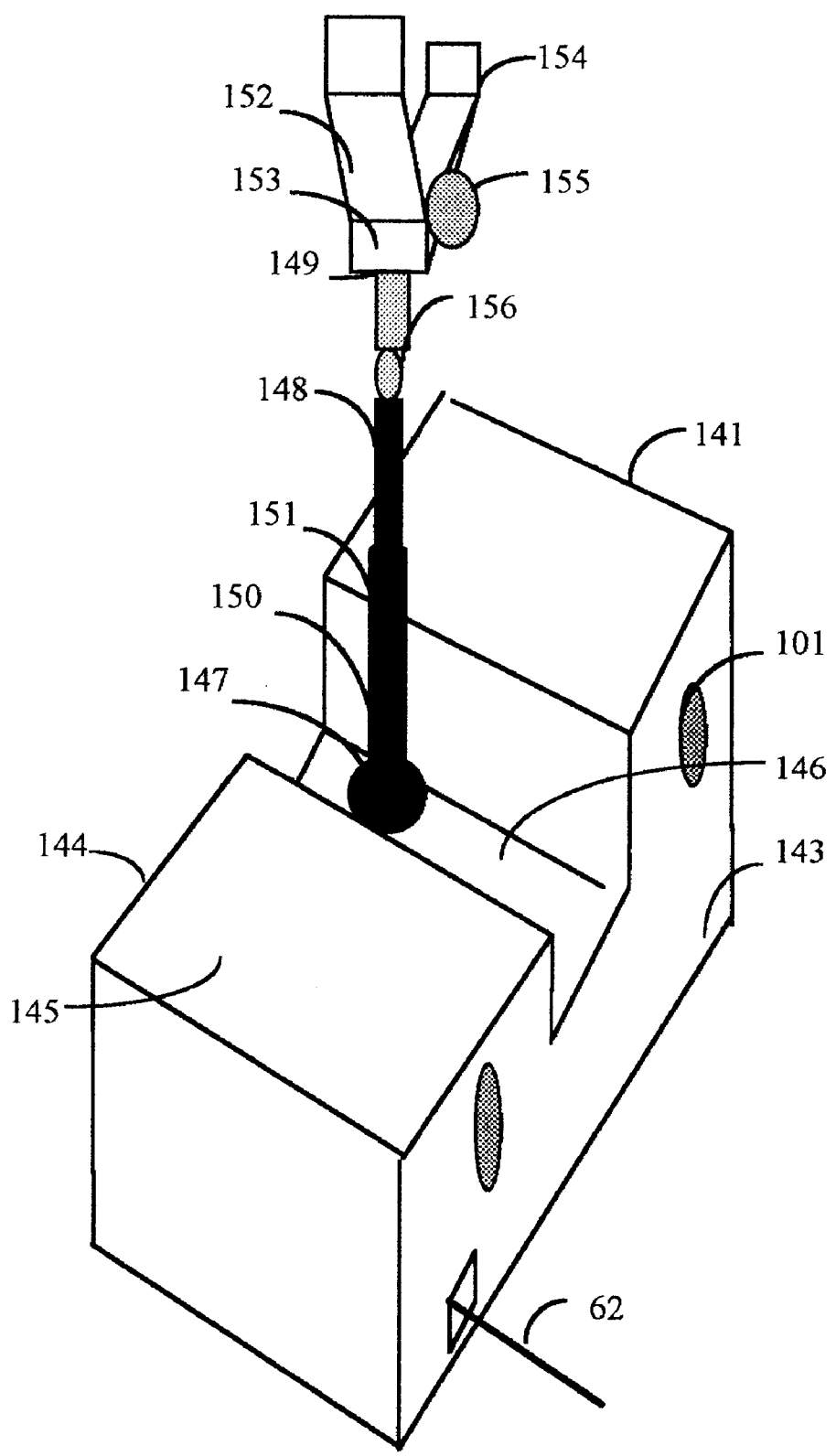
FIG. 5 is a top-rear perspective view of the navigation device wherein its mounting assembly provides for the device to be mounted behind the vehicle's rearview mirror.

FIG. 5 is a top-rear perspective view of the navigation device wherein its mounting assembly provides for the device to be mounted behind the vehicle's rearview mirror. In this embodiment the invention's mounting assembly, 140, is seen to comprise: a case, 141, having a box-shape with inner and outer surfaces, including outer front, 144, rear, 143, and top, 145, surfaces, wherein the case, 141, is so configured and of a size so that, when the front surface, 144, of the case, 141, is in close proximity to the rear surface, 14, of the vehicle's rearview mirror frame, 12, the vehicle operator's field of view is not obstructed. This is due in part to the outer top surface, 145, of the case, 141, having a recessed portion, 146, that accommodates the rearview mirror frame's mounting arm, 15, while allowing the outer front surface, 144, of the case, 141, to be placed in close proximity to the rear surface, 14, of the vehicle's rearview mirror frame, 12.

FIG. 5 further shows that this embodiment of the mounting assembly, 140, comprises: a ball joint, 147, attached to the case's outer top surface, 145, an extendible pole, 148, having a top end, 149, and a bottom end, 150, wherein the bottom end, 150, is attached to the ball joint, 147, with the pole, 148, having a plurality of tubular members, 151, that are retractably emeshed with each other, a clamp, 152, having a clamp base, 153, a pair of clamping jaws, 154, attached to the clamp base, 153, and means, 155, such as a screw knob, coupled to the clamping jaws, 154, for biasing the clamping jaws towards one another so that they releasably affix the clamp, 152, to the rearview mirror frame's mounting arm, 15, and a hinge, 156, that couples the clamp base, 153, with the top end, 149, of the extendible pole, 148.

The device, 1, is to be attached to the mounting arm, 15, of the rearview mirror, 10, with a clamp, 152, that in the embodiment shown in FIG. 5 is tightened with a screw knob, 155. To clear the mounting arm, 15, holding the existing mirror frame, 12, and to allow the device, 1, to be installed and adjusted within the constrained, tight, interior space environment of a vehicle, a number of specific mechanical arrangements are made in the mounting assembly, 140; these include the case's recessed portion, 146, an extendible pole, 148, for raising or lowering the case, 141, a hinge, 156, on the extendible pole, 148, and a ball joint, 147, at the bottom of the pole, 148, for adjusting the position of the case, 141, relative to the vehicle's rearview mirror, 10.

Figure 6:
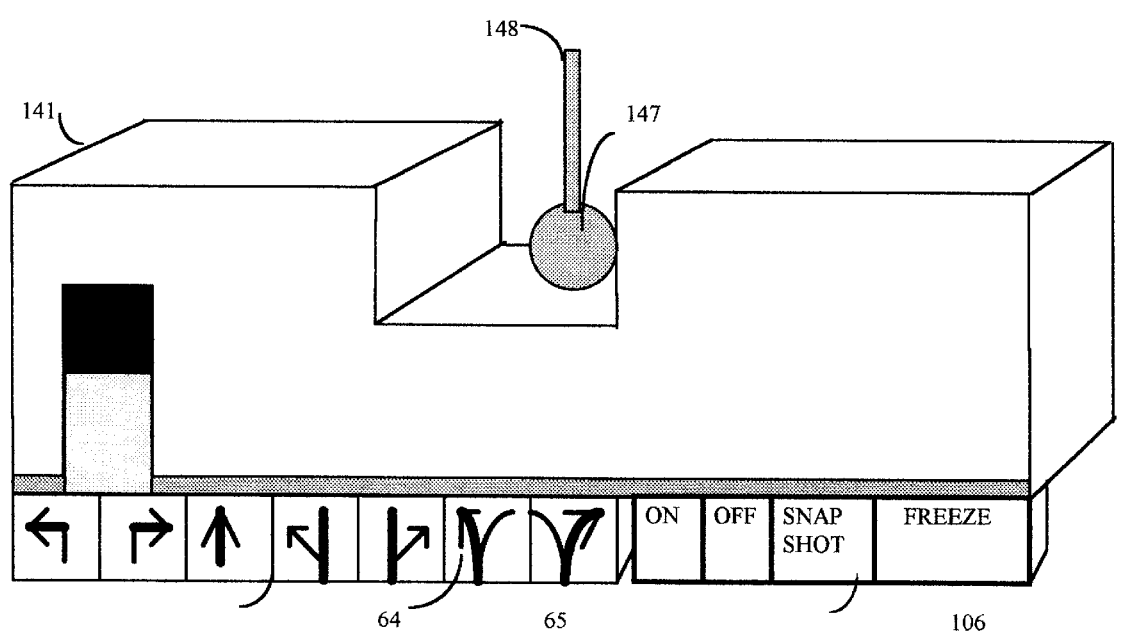
FIG. 6 is a front perspective view of the navigation device shown in FIG. 5.

FIG. 6 is a front perspective view of the navigation device shown in FIG. 5. The directional indicator screen, 64, that displays icons, 65, is seen to be mounted near the bottom of the mounting assembly case, 141, so that the screen, 64, will extend slightly below the bottom of the vehicle's rearview mirror and in such a manner so as not to impede the vehicle operator's field of view.

Figure 7:
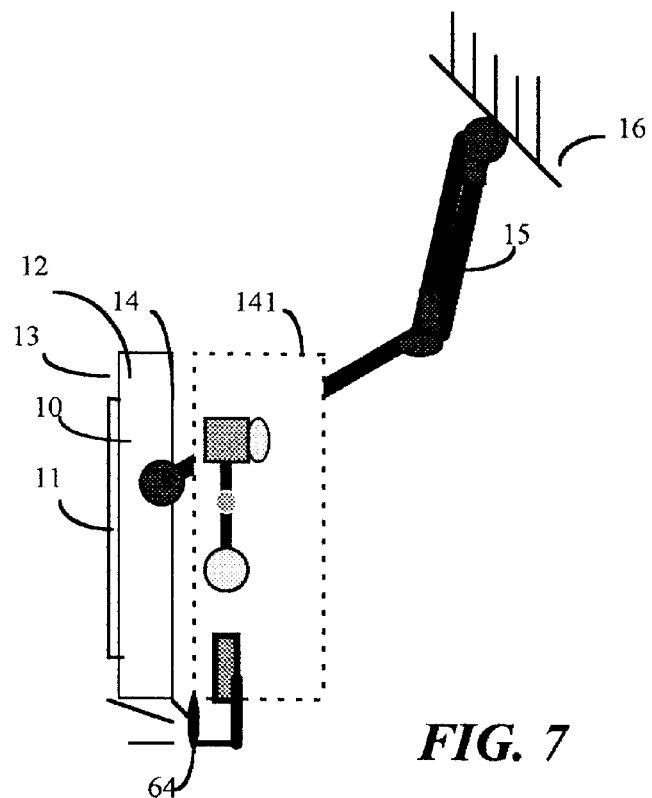
FIG. 7 is a side view of the navigation device wherein its mounting assembly provides for the device to be mounted behind the vehicle's rearview mirror.
Figure 8:
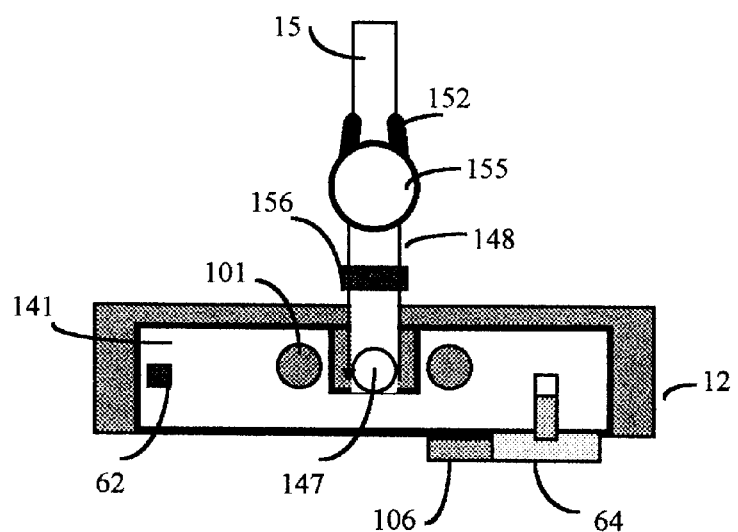
FIG. 8 is a rear view, as if looking through the vehicle's front windshield and into the vehicle, of the navigation device shown in FIG. 7.

FIG. 7 is a side view of an embodiment of the present invention wherein its mounting assembly provides for the device to be mounted behind the vehicle's rearview mirror. In this configuration, the vehicle is seen to have a rearview mirror, 10, with a mirror, 1, attached to the front surface, 13, of a frame, 12, and from the rear side, 14, of this frame, 12, extends a mounting arm, 15, that holds the frame in a desired position and connects the frame to an interior surface, 16, of the vehicle. Further details of how this embodiment of the present invention fits with the vehicle's rearview mirror, 10, can be seen in FIG. 8 which is a rear view, as if looking through the vehicle's front windshield and into the vehicle, of the navigation device shown in FIG. 7.

Figure 9:
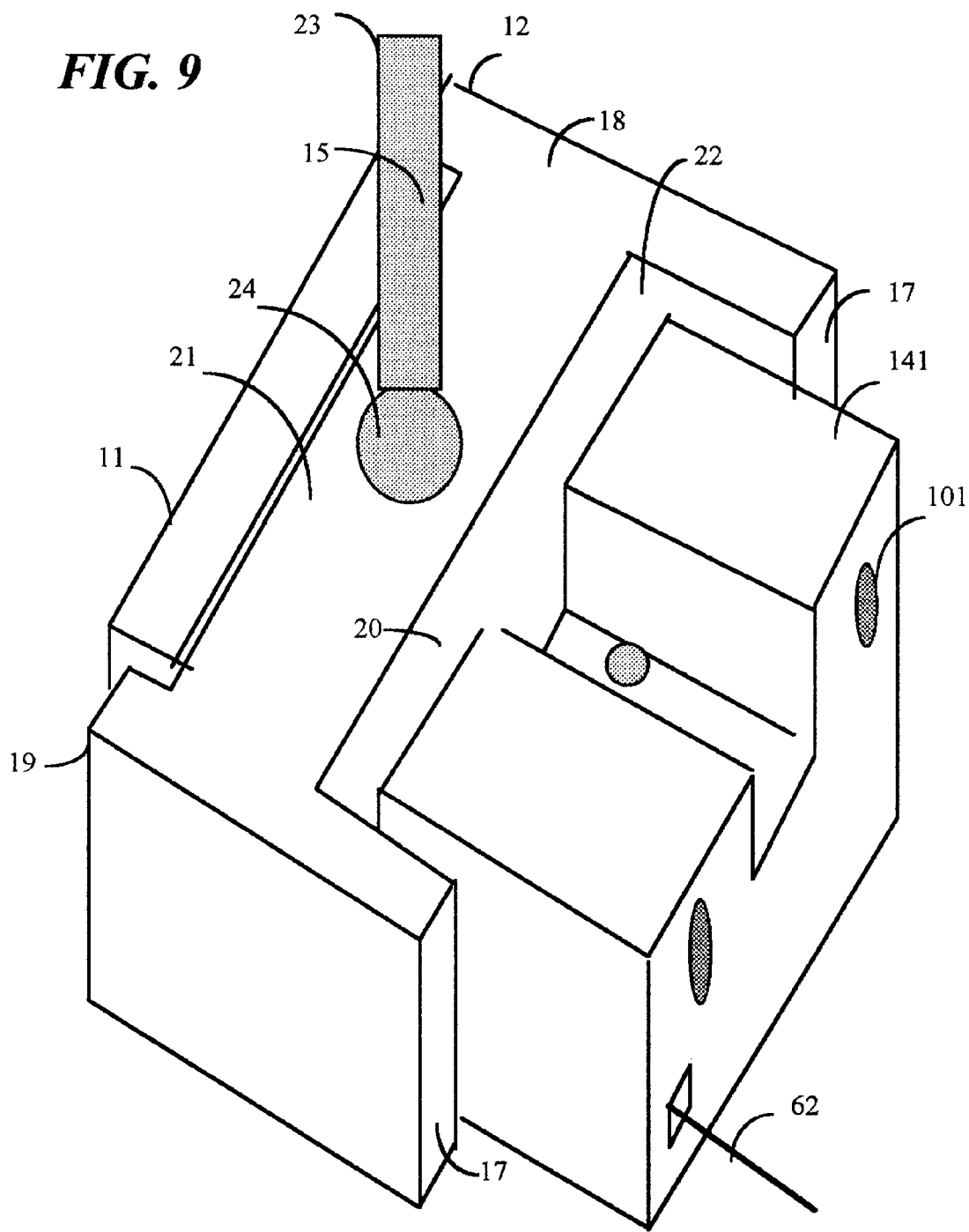
FIG. 9 is a top-rear perspective view of the navigation device wherein its mounting assembly provides for the device to be mounted as an integral part of the vehicle's rearview mirror.

FIG. 9 is a top-rear perspective view of the navigation device wherein its mounting assembly provides for the device to be mounted as an integral part of the vehicle's rearview mirror. In this configuration, the vehicle is seen to have a rearview assembly that is especially configured to mesh with the mounting assembly case, 141, with the rearview mirror assembly comprising a frame, 12, having a pair of leg portions, 17, horizontally spaced apart from one another and connected by a middle portion, 18, which has a front, 19, rear, 20, and top, 21, surface. The middle portion, 18, extends between and connects to the leg portions, 17, so as to define a slot, 22, in the frame, 12, for receiving and supporting the sides of the case, 141, therein between the leg portions, 17, and the rear surface, 20, of the middle portion, 18. This rearview mirror assembly further comprises a mirror, 11, attached to the front surface, 19, of the middle portion, 18, of the frame, with a mounting arm, 15, having a top, 23, and bottom, 24, end, the bottom end, 24, being attached to the top surface, 21, of the middle portion, 18, with the arm, 15, holding the frame, 12, in a desired position with top end, 23, of the arm connected to an interior surface, 16, of the vehicle.

Figure 10:
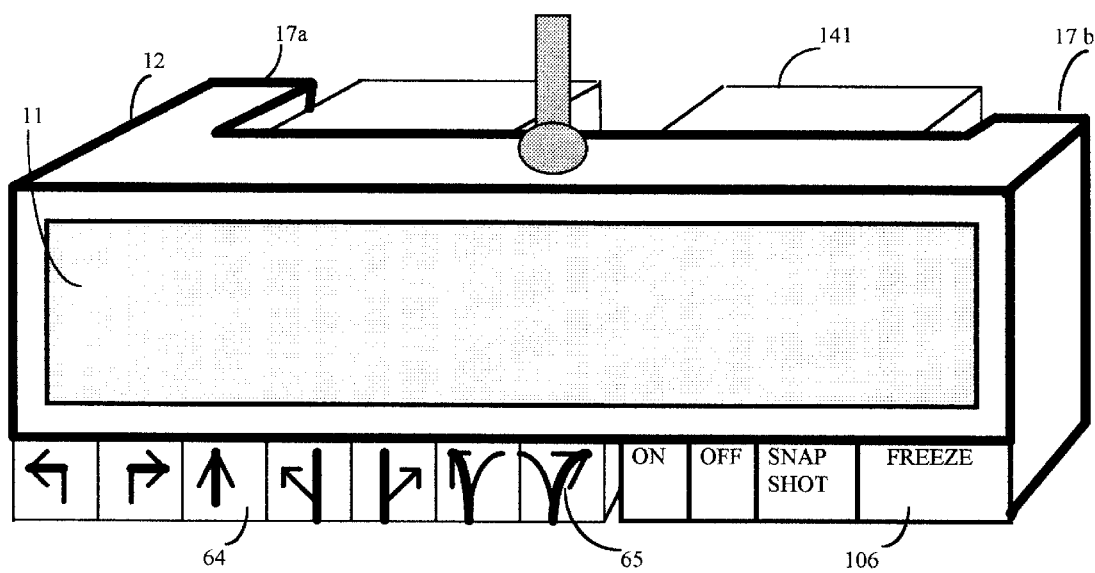
FIG. 10 is a front perspective view of the navigation device shown in FIG. 9.

FIG. 10 is a front perspective view of the navigation device shown in FIG. 9. The directional indicator screen, 64, that displays icons, 65, is seen to be mounted near the bottom of the mounting assembly case, 141, so that the screen, 64, will extend slightly below the bottom of the vehicle's rearview mirror and in such a manner so as not to impede the vehicle operator's field of view.

Figure 11:
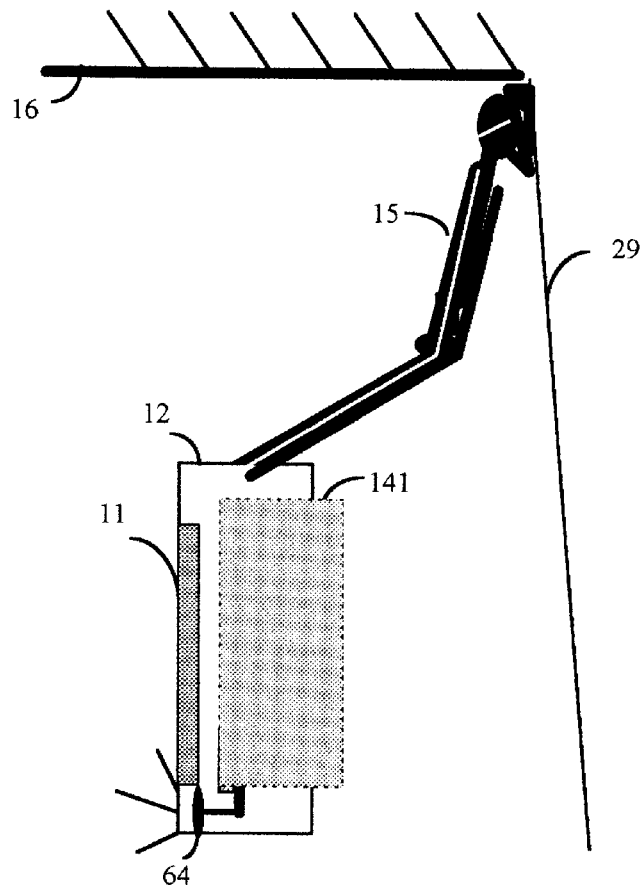
FIG. 11 is a side view of the navigation device wherein its mounting assembly provides for the device to be mounted as an integral part of the vehicle's rearview mirror.
Figure 12:
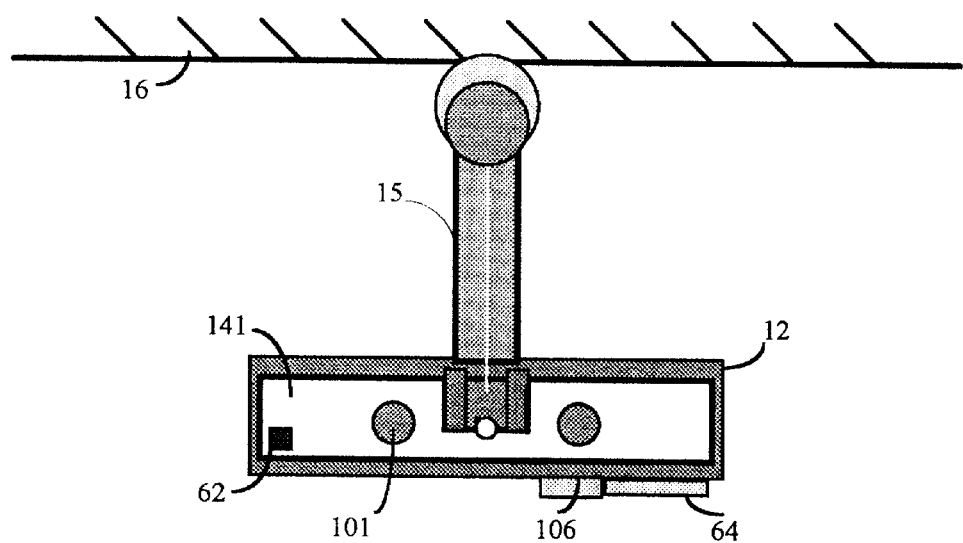
FIG. 12 is a rear view of the navigation device shown in FIG. 11.

FIG. 11 is a side view of the navigation device shown in FIG. 9. The manner of attachment of the rearview mirror assembly to an interior surface, 16, of the vehicle is shown FIG. 12 provides a rear view of this assembly.

Figure 13:
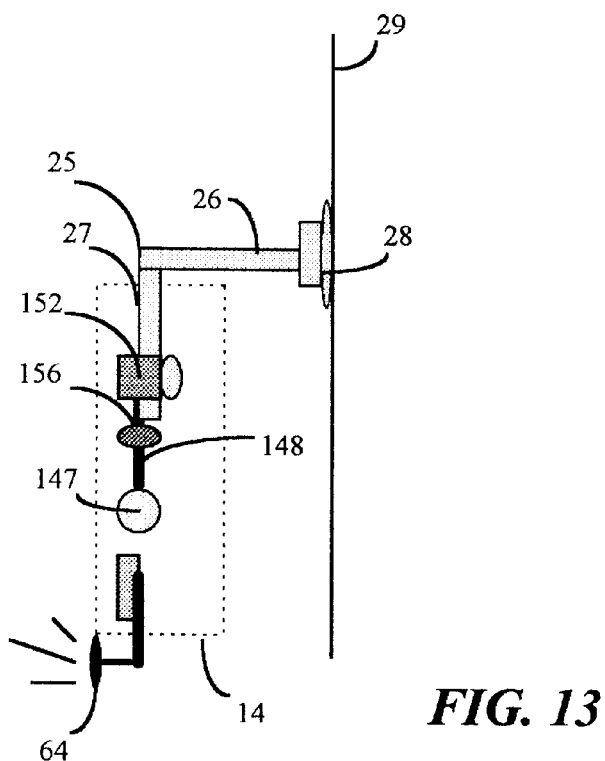
FIG. 13 is a side view of the navigation device wherein its mounting assembly provides for the device to be attached to the vehicle's front windshield.

FIG. 13 is a side view of the navigation device wherein its mounting assembly provides for the device to be attached to the vehicle's front windshield. To allow for this, the mounting assembly in this embodiment further includes: a mounting platform, 25, having a base, 26, a mounting arm, 27, extending from the base, 26, and a plurality of adhesive pads, 28, attached to the base and which releasably affix the platform, 25, to the front windshield, 29, of the vehicle. Also shown in FIG. 13 are other key elements of the mounting assembly of the present invention, including: a case, 141, a ball joint, 147, attached to the case's outer top surface, 145, an extendible pole, 148, a clamp, 152, and a hinge, 156.

Figure 14:
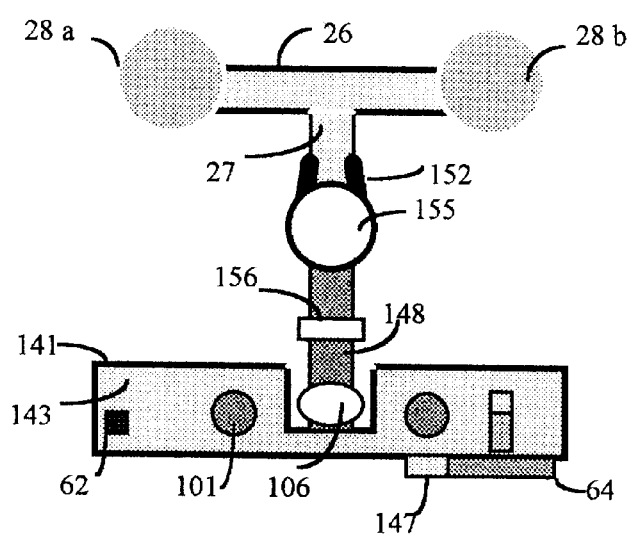
FIG. 14 is a rear view of the navigation device shown in FIG. 13.

FIG. 14 is a rear view of the navigation device shown in FIG. 13. The case's outer, rear surface, 143, is seen to have attached to it a GPS antenna and receiver, 62, an image capturing device, 101, and a directional indicator screen, 64.

Figure 15:
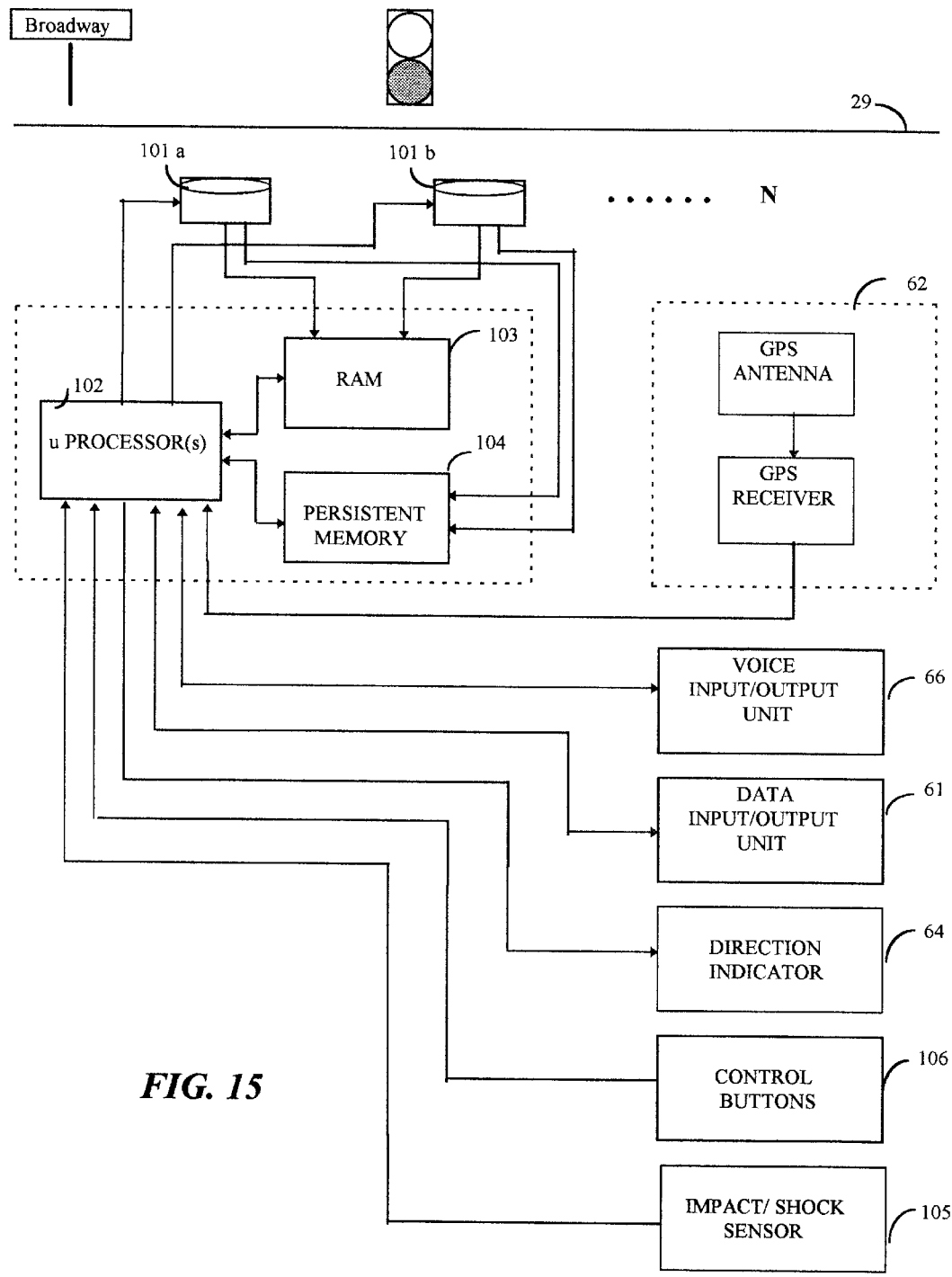
FIG. 15 is a schematic block diagram showing the essential components of the computational, communications and vision units for one embodiment of the present invention.

FIG. 15 is a schematic block diagram showing the essential components of the computational, communications and vision units for one embodiment of the present invention. Key elements shown include: an image capturing device, 101, for detecting visual information that comes within the vicinity of the vehicle, a microprocessor, 102, coupled to the image capturing device, 101, a memory device, 103, and a persistent memory device, 104, coupled to the microprocessor, 102. Also coupled to the microprocessor, 102, are: means, 105, such as a impact/shock sensor, for triggering the automatic storage in the persistent memory device, 104, of a plurality of consecutive frames of detected visual information that comes within the vicinity of the vehicle, and means, 106, such as a control button, for manually triggering the storage in the persistent memory device, 104, of consecutive frames of detected visual information, a data input and output port, 61, that receives data from and communicates data to an external computer, 2, a global position system (GPS) antenna and receiver, 62, a directional indicator screen, 64, that displays icons, 65, which provide navigational information in a visual form and a voice input-output system, 66, that converts a vehicle operator's spoken message into digital information for input into the microprocessor, 102, while also using portions of the computational unit's digital output to provide the vehicle operator with navigational information in an audible form.

It thus will be appreciated that a new and improved visual-information-stimulated, navigation device, 1, has been described which achieves the objects of enhancing an individual's ability to comprehend and quickly react to all the information that visually comes within the field of view of the individual thereby enhancing the individual's performance.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

I claim:

1. A digital in-vehicle device comprising:
   an image capturing device for continuously capturing actual road scene that comes within the vicinity of vehicle in real-time,
   a vision microprocessor coupled to said image capturing device for controlling the operation of said image capturing device,
   a vision memory device coupled to said vision microprocessor,
   a persistent memory device coupled to said vision microprocessor, wherein said persistent memory device is a non-volatile storage device,
   means connected to said vision microprocessor for automatically triggering a permanent storage, in said persistent memory device, of a plurality of consecutive frames of captured visual scene that comes within the vicinity of said vehicle, wherein said permanent storage of a plurality of consecutive frames is achieved by means of prohibiting the current content in said persistent memory from being over-written by new images after a pre-programmed elapsed time period such that said plurality of consecutive frames stored are composed of a number of images captured so many seconds before and after said triggering occurs, wherein the number of said images stored is a function of the size of said persistent memory, wherein said persistent memory consisting of a finite number of storage elements overwritten repeatedly by said vision microprocessor in a first-in-first-out fashion so that a finite storage can be used to buffer up a plurality of said images continuously, and
   means connected to said vision microprocessor for manually triggering the said permanent storage, in said persistent memory device, of frames of said visual scene that comes within the vicinity of said vehicle, wherein said manually triggering can be an action selected from the group consisting of taking snap shots of visual scene, taking a sequence of continuous images of visual scene, and freezing the activity of said continuously capturing visual information so as to prevent existing said images in said persistent memory of being replaced by new images in order to preserve existing said images,
   wherein said stored frames can be used for various purposes, including accident aftermath analysis and documentation of the visual aspects of an event or scene that occurs within the vicinity of the vehicle.

2. A digital in-vehicle device as recited in claim 1 further comprises:
   a mounting assembly for mounting said devices so as to allow said devices to be securely and steadily positioned, while at the same time causing minimum interference with the vehicle operator's field of view, said assembly providing for a mounting arrangement chosen from the group consisting of mounting said devices behind the vehicle's rearview mirror and mounting said devices as an integral part of the vehicle's rearview mirror.

3. A digital in-vehicle device as recited in claim 1 further comprises:
   a computational microprocessor,
   a computational memory and storage device coupled to said computational microprocessor, and
   a communications unit.

4. A digital in-vehicle device as recited in claim 3 further comprises:
   a mounting assembly for mounting said devices and said units so as to allow said devices and said units to be securely and steadily positioned, while at the same time causing minimum interference with the vehicle operator's field of view, said assembly providing for a mounting arrangement chosen from the group consisting of mounting said devices and said units behind the vehicle's rearview mirror and mounting said device as an integral part of the vehicle's rearview mirror.

5. A digital in-vehicle device as recited in claim 3, wherein said computational and vision microprocessors are merged into the same microprocessor and said computational and vision memory devices are merged into the same memory device.

6. A digital in-vehicle device as recited in claim 3, wherein said communications unit comprises:
   a data input and output port connected to said computational unit that receives data from and communicates data to an external computer,
   a global position system (GPS) antenna and receiver that are connected to said computational unit for receiving signals from GPS satellites, wherein said computational unit further comprises the means for processing said GPS signals to help determine the current position of said vehicle, and
   means for providing communications from said computational unit to a vehicle operator, said means connected to said computational unit and chosen from the group consisting of a directional indicator screen that displays icons which provide navigational information in a visual form, and a voice input-output system, which is connected to said computational unit, that converts a vehicle operator's spoken message into digital information for input into said computational unit, while also using portions of the computational unit's digital output to provide the vehicle operator with navigational information in an audible form.

7. A digital in-vehicle device as recited in claim 6, wherein said
   antenna and receiver are portable and located inside a vehicle exposed to the sky through the windshield such that said antenna and receiver can be readily used for most vehicles without any special or deliberate arrangement.

8. A digital in-vehicle device as recited in claim 2, wherein, for a vehicle having a rearview mirror with a mirror attached to the front surface of a frame and from the rear side of said frame extends a mounting arm that holds the frame in a desired position and connects the frame to an interior surface of said vehicle, comprising a mounting assembly for mounting said devices behind said vehicle's rearview mirror comprises:
- a case having a box-shape with inner and outer surfaces, including outer front and top surfaces, said devices being operationally connected to said inner surfaces so that the case forms a protective enclosure for said devices, said case so configured and of a size so that, when the front surface of said case is in close proximity to the rear surface of said rearview mirror frame, the vehicle operator's field of view is not obstructed, and said outer top surface of said case having a recessed portion that accommodates the rearview mirror frame's mounting arm while allowing the said front outer surface of said case to be placed in close proximity to the rear surface of said rearview mirror frame,
- a ball joint attached to said case's outer top surface,
- an extendible pole having a top end and a bottom end, said bottom end being attached to said ball joint, said pole having a plurality of tubular members that are retractably emeshed with each other,
- a clamp having a clamp base, a pair of clamping jaws attached to said clamp base, and means coupled to said clamping jaws for biasing said clamping jaws towards one another so that they releasably affix said clamp to said rearview mirror frame mounting arm, and
- a hinge that couples said clamp base with the top end of said extendible pole.

9. A digital in-vehicle device as recited in claim 4 wherein, for a vehicle having a rearview mirror with a mirror attached to the front surface of a frame and from the rear side of said frame extends a mounting arm that holds the frame in a desired position and connects the frame to an interior surface of said vehicle, comprising a mounting assembly for mounting said devices and said units behind said vehicle's rearview mirror comprises:
- a case having a box-shape with inner and outer surfaces, including outer front and top surfaces, said devices and said units being operationally connected to said inner surfaces so that the case forms a protective enclosure for said devices and said units, said case so configured and of a size so that, when the front surface of said case is in close proximity to the rear surface of said rearview mirror frame, the vehicle operator's field of view is not obstructed, and said outer top surface of said case having a recessed portion that accommodates the rearview mirror frame's mounting arm while allowing the said front outer surface of said case to be placed in close proximity to the rear surface of said rearview mirror frame,
- a ball joint attached to said case's outer top surface,
- an extendible pole having a top end and a bottom end, said bottom end being attached to said ball joint, said pole having a plurality of tubular members that are retractably emeshed with each other,
- a clamp having a clamp base, a pair of clamping jaws attached to said clamp base, and means coupled to said clamping jaws for biasing said clamping jaws towards one another so that they releasably affix said clamp to said rearview mirror frame mounting arm, and
- a hinge that couples said clamp base with the top end of said extendible pole.

10. A digital in-vehicle device as recited in claim 2, wherein said mounting assembly for mounting said devices as an integral part of the vehicle's rearview mirror comprises:
- a case having a box-shape with inner and outer surfaces, including outer front, back and side surfaces, said devices being operationally connected to said inner surfaces so that the case forms a protective enclosure for said devices,
- wherein said vehicle having a rearview mirror assembly that is especially configured to mesh with said case, said rearview mirror assembly comprising a frame having a pair of leg portions horizontally spaced apart from one another and connected by a middle portion, which has a front, rear and top surface, said middle portion extending between and connected to said leg portions so as to define a slot in said frame for receiving and supporting the sides of said case therein between said leg portions and the rear surface of said middle portion,
- wherein said rearview mirror assembly further comprising a mirror attached to the front surface of the middle portion of said frame, a mounting arm having a top and bottom end, the bottom end being attached to the top surface of said middle portion, the arm holding the frame in a desired position with top end of said arm connected to an interior surface of said vehicle.

11. A digital in-vehicle device as recited in claim 4, wherein said mounting assembly mounting said devices and said units as an integral part of the vehicle's rearview mirror comprises:
- a case having a box-shape with inner and outer surfaces, including outer front, back and side surfaces, said devices and said units being operationally connected to said inner surfaces so that the case forms a protective enclosure for said devices and said units,
- wherein said vehicle having a rearview mirror assembly that is especially configured to mesh with said case, said rearview mirror assembly comprising a frame having a pair of leg portions horizontally spaced apart from one another and connected by a middle portion, which has a front, rear and top surface, said middle portion extending between and connected to said leg portions so as to define a slot in said frame for receiving and supporting the sides of said case therein between said leg portions and the rear surface of said middle portion,
- wherein said rearview mirror assembly further comprising a mirror attached to the front surface of the middle portion of said frame, a mounting arm having a top and bottom end, the bottom end being attached to the top surface of said middle portion, the arm holding the frame in a desired position with top end of said arm connected to an interior surface of said vehicle.

12. A digital in-vehicle device as recited in claim 1, wherein said
- means connected to said vision microprocessor for triggering the automatic storage including a variety of mechanisms chosen from the group consisting of programmable logical instructions resided inside said vision memory that fire off signals to said vision microprocessor in responding to said actual scene captured, hardware mechanisms and combinations thereof, wherein said hardware mechanism including at least one sensor capable of sending out a signal to said vision microprocessor upon detecting a physical event, wherein said physical event can be a physical impact, sudden change in momentum, sudden change in sound wave amplitude and combinations thereof.

13. A digital in-vehicle device as recited in claim 1, wherein said means connected to said vision microprocessor for manually triggering the storage in said persistent memory device of detected visual information that comes within the vicinity of said vehicle including at least one mechanism capable of causing a signal to be sent to said vision microprocessor, wherein said mechanism is selected from the group consisting of push button, flip switch and voice input unit.

14. A method for digitally capturing an actual scene on a road in real-time so that captured images can be used for various purposes, including accident aftermath analysis, documentation of the visual aspects of an event or scene that occurs within a vicinity of a vehicle and navigation assistance, said method comprises steps of:

continuously capturing actual road scene that comes within the vicinity of vehicle in real-time on the road and converting said scene into digital form, controlling the operation and timing of said capture process, permanently storing up captured said images so that said images can be retrieved for viewing at a later time, continuously buffering up a plurality of captured images using a first-in-first-out mechanism so that said buffered images can be preserved permanently if so desired, automatically triggering a permanent storage of a plurality of consecutive frames of captured visual information that comes within the vicinity of said vehicle, wherein said permanent storage of a plurality of consecutive frames is achieved by prohibiting older said images from being erased and replaced by newer images after a pre-programmed elapsed time period such that said plurality of consecutive frames stored are composed of a number of images captured so many seconds before and after said automatic triggering, and manually triggering the storage in a persistent memory device of consecutive frames of detected visual information that comes within the vicinity of said vehicle, wherein said manually triggering can be an action selected from the group consisting of taking snap shots of visual scene, taking a sequence of continuous images of visual scene, and freezing the activity of said continuously capturing visual information so as to prevent existing said images in said persistent memory be replaced by new images in order to preserve existing said images.

15. The method as recited in claim 14 further comprising the step of:

analyzing said images to extract information in real-time useful for navigation assistance, said information including text on street plate, text on highway sign, symbols on street/highway sign, traffic light figures, road marks, street intersection patterns and general road scene information.

16. The method as recited in claim 14 further comprising the step of:

receiving global positioning system (GPS) signals for travel direction and position assistance.

17. The method as recited in claim 15 further comprising the step of:

providing directional information to said operator in a manner which does not distract said operator from more important concurrent task, wherein said direction indication is in the form of display symbol within the field of view of said operator.

18. The method as recited in claim 16 further comprising the step of:

providing directional information to said operator in a manner which does not distract said operator from more important concurrent task, wherein said direction indication is in the form of display symbol within the field of view of said operator.

19. The method as recited in claim 14 further comprising the steps of:

providing information to said operator in an audible form, and receiving verbal command from said operator and converting said command into digital form.

20. The method as recited in claim 14 further comprising the step of:

detecting external events including physical impact, sudden change of momentum, sudden change of sound amplitude, and unusual occurrence or movement of objects in said visual scene captured so as to generate said automatic triggering.

* * * * *

UNITED STATES PATENT AND TRADEMARK OFFICE
CERTIFICATE OF CORRECTION

PATENT NO. : 5,899,956
DATED : May 4, 1999
INVENTOR(S) : Chan

It is certified that error appears in the above-identified patent and that said Letters Patent is hereby corrected as shown below:

On the title page, under item [56], Attorney, Agent, or Firm, delete "Larry J. Guffey"

Signed and Sealed this

Twenty-fourth Day of August, 1999

Attest:

Q. TODD DICKINSON

*Attesting Officer*     *Acting Commissioner of Patents and Trademarks*